United States Patent
Kakihara

(10) Patent No.: US 6,716,537 B1
(45) Date of Patent: Apr. 6, 2004

(54) MAGNETORESISTIVE ELEMENT HAVING MULTILAYERED FILM CAPABLE OF EFFECTIVELY CONDUCTING A DETECTING CURRENT FOR DETECTING EXTERNAL MAGNETIC FIELD AND METHOD FOR MAKING THE SAME

(75) Inventor: Yoshihiko Kakihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/662,427

(22) Filed: Sep. 13, 2000

(30) Foreign Application Priority Data

Sep. 16, 1999 (JP) .............................. 11-261687

(51) Int. Cl.$^7$ .............................................. G11B 5/127
(52) U.S. Cl. ................. 428/611; 428/640; 428/668; 428/680; 428/681; 428/156; 428/692; 360/324.1; 360/324.12
(58) Field of Search .............. 360/322, 324.12, 360/327.21, 327.24, 110; 428/692, 611, 640, 668, 680, 681, 156, 900

(56) References Cited

U.S. PATENT DOCUMENTS

| | | |
|---|---|---|
| 5,206,590 A | 4/1993 | Dieny et al. |
| 5,583,725 A | 12/1996 | Coffey et al. |
| 5,641,557 A * | 6/1997 | Ishiwata ..................... 428/209 |
| 5,936,810 A * | 8/1999 | Nakamoto et al. .......... 360/322 |
| 5,972,420 A | 10/1999 | Saito et al. |
| 6,040,962 A * | 3/2000 | Kanazawa et al. .......... 360/322 |
| 6,147,843 A * | 11/2000 | Yamamoto et al. ......... 360/313 |
| 6,282,069 B1 * | 8/2001 | Nakazawa et al. ....... 360/324.2 |

FOREIGN PATENT DOCUMENTS

| | | |
|---|---|---|
| EP | 0676747 A2 | 11/1995 |
| JP | 10-124823 | 5/1998 |
| JP | 10-294506 A * | 11/1998 |
| JP | 11-53716 | 2/1999 |
| JP | 11-86237 | 3/1999 |
| JP | 11-213342 | 8/1999 |
| JP | 11232616 | 8/1999 |

OTHER PUBLICATIONS

Derwent Abstract Translation of JP 10–294506A (Derwent Acc. No. 1999–031296).*

* cited by examiner

Primary Examiner—Paul Thibodeau
Assistant Examiner—Kevin M. Bernatz
(74) Attorney, Agent, or Firm—Brinks Hofer Gilson & Lione

(57) ABSTRACT

A magnetoresistive element includes a multilayered film comprising a magnetic detecting layer having a magnetoresistive effect, a pair of first antiferromagnetic layers in contact with the magnetic detecting layer of the multilayered film at a predetermined gap in the track width direction, the first antiferromagnetic layers aligning the magnetization direction of the magnetic detecting layer, and a pair of conductive layers in contact with the pair of first antiferromagnetic layers, the pair of conductive layers applying a detecting current to the multilayered film. The first antiferromagnetic layers are composed of an antiferromagnetic material having higher resistivity than that of the conductive layers. The conductive layers are superimposed with the corresponding first antiferromagnetic layers and are in contact with the magnetic detecting layer in a range of the predetermined gap. The distance between the pair of conductive layers defines a track width when the multilayered film detects an external magnetic field.

6 Claims, 11 Drawing Sheets

MAGNETORESISTIVE ELEMENT HAVING MULTILAYERED FILM CAPABLE OF EFFECTIVELY CONDUCTING A DETECTING CURRENT FOR DETECTING EXTERNAL MAGNETIC FIELD AND METHOD FOR MAKING THE SAME

BACKGROUND OF THE INVENTION

1. Field of the Invention

The present invention relates to spin-valve thin-film elements in which the resistivity is varied by the relationship between the magnetization direction of a pinned magnetic layer and the magnetization direction of a free magnetic layer affected by an external magnetic field. In particular, the present invention relates to a magnetoresistive element which can effectively conduct a detecting current to a multilayered film included therein and a method for making the magnetoresistive element.

2. Description of the Related Art

FIG. 21 is a cross-sectional view at an air bearing surface (ABS) of a conventional magnetoresistive element. This magnetoresistive element is called a spin-valve thin-film element which is one of giant magnetoresistive (GMR) elements using a giant magnetoresistive effect, and detects a recorded magnetic field from magnetic media such as a hard disk.

The spin-valve thin-film element has a multilayered film 10 composed of, from the bottom, a second antiferromagnetic layer 1, a pinned magnetic layer 2, a nonmagnetic conductive layer 3, and a free magnetic layer 4. The second antiferromagnetic layer 1 is generally composed of an iron-manganese (Fe—Mn) alloy or a nickel-manganese (Ni—Mn) alloy. Each of the pinned magnetic layer 2 and the free magnetic layer 4 is generally composed of a nickel-iron (Ni—Fe) alloy. The nonmagnetic conductive layer 3 is generally composed of copper (Cu).

As shown in FIG. 21, the thickness of the free magnetic layer 4 is smaller in both side regions A in the track width direction (X direction in the drawing) than that in the central region B. Ferromagnetic layers 5 formed of, for example, a Ni—Fe alloy are provided on the side regions A.

A pair of first antiferromagnetic layers 6 is formed on the ferromagnetic layers 5 and is separated at an interval of the track width Tw. In conventional technology, the first antiferromagnetic layers 6 are composed of an iridium-manganese (Ir—Mn) alloy or the like. Moreover, conductive layers 7 formed of chromium (Cr) are provided on the first antiferromagnetic layers 6.

In this spin-valve thin-film element, a lower gap layer 8 is provided under the second antiferromagnetic layer 1, and an upper gap layer 9 is provided over the conductive layers 7. The lower gap layer 8 and the upper gap layer 9 are composed of an insulating material such as alumina ($Al_2O_3$).

The magnetization of the pinned magnetic layer 2 is aligned in a single-domain state in the Y direction (the direction of the fringing magnetic field from the recording medium, that is, the height direction) by exchange anisotropic magnetic field between the pinned magnetic layer 2 and the second antiferromagnetic layer 1. Exchange anisotropic magnetic fields are generated between the ferromagnetic layers 5 and the first antiferromagnetic layers 6 and between the ferromagnetic layers 5 and the free magnetic layer 4 at the side regions A, and magnetize the ferromagnetic layers 5 and the free magnetic layer 4 at the side regions A in the X direction. As a result, the magnetization of the free magnetic layer 4 is affected by the bias magnetic field from the ferromagnetic layers 5 and the free magnetic layer 4 at the side regions A and is aligned in the X direction. Accordingly, the magnetization of the pinned magnetic layer 2 and the magnetization of the free magnetic layer 4 are orthogonal.

In this spin-valve thin-film element, a detecting current which is supplied from the conductive layers 7 via the first antiferromagnetic layers 6 flows in the pinned magnetic layer 2, the nonmagnetic conductive layer 3, and the free magnetic layer 4. The recording medium such as a hard disk moves in the Z direction, and a fringing magnetic field from the recording medium is oriented in the Y direction. This fringing magnetic field changes the magnetization direction of the free magnetic layer 4 from the X direction to the Y direction. The resistivity of the element is varied by the relationship between the variable magnetization direction of the free magnetic layer 4 and the pinned magnetization direction of the pinned magnetic layer 2. Such a change in resistivity is called a magnetoresistive effect and is detected as a change in voltage. The fringing magnetic field from the recording medium is detected in such a manner.

The magnetoresistive element shown in FIG. 21, however, has the following problems. Since the conductive layers 7 are formed on the first antiferromagnetic layers 6, the detecting current flows in the pinned magnetic layer 2, the nonmagnetic conductive layer 3, and the free magnetic layer 4, via the first antiferromagnetic layers 6. Since the first antiferromagnetic layers 6 are formed of an antiferromagnetic material such as an Ir—Mn alloy having relatively large resistivity, the detecting current flowing in the multilayered film 10 is reduced.

As described above, the magnetization of the free magnetic layer 4 is oriented in the X direction by the bias magnetic field due to the exchange anisotropic magnetic field which is generated between the ferromagnetic layers 5 and the first antiferromagnetic layers 6. The free magnetic layer 4 is firmly magnetized in the X direction at boundary regions D near the ferromagnetic layers 5 by the effect of the strong bias magnetic field. Thus, the magnetization of the free magnetic layer 4 is not adequately varied by the external magnetic field.

The boundary regions D, which do not exhibit an adequate change in the magnetization, is called dead regions. Thus, the substantial sensitive region, which exhibits an adequate change in the magnetization by the effect of the external magnetic field and thus has a magnetoresistive effect, is a region of the track width Tw other than the dead regions. As a result, the dead regions significantly decrease the fraction of the detecting current in the sensitive region. Thus, a desired amount of detecting current does not flow in the sensitive region, resulting in the generation of noise and a decrease in read output.

SUMMARY OF THE INVENTION

Accordingly, it is an object of the present invention to provide a magnetoresistive element which can effectively conducts a detecting current to a triplelayered film including a free magnetic layer, a nonmagnetic conductive layer, and a pinned magnetic layer and having a magnetoresistive effect and which exhibits improved output characteristics.

It is another object of the present invention to provide a method for making the magnetoresistive element.

According to an aspect of the present invention, a magnetoresistive element comprises a multilayered film comprising a magnetic detecting layer having a magnetoresistive effect, a pair of first antiferromagnetic layers in contact with the magnetic detecting layer of the multilayered film at a predetermined gap in the track width direction, the first antiferromagnetic layers aligning the magnetization direction of the magnetic detecting layer, and a pair of conductive layers in contact with the pair of first antiferromagnetic layers, the pair of conductive layers applying a detecting current to the multilayered film. The first antiferromagnetic layers comprise an antiferromagnetic material having higher resistivity than that of the conductive layers, the conductive layers are superimposed with the corresponding first antiferromagnetic layers and are in contact with the magnetic detecting layer in a range of the predetermined gap, and the distance between the pair of conductive layers defines a track width when the multilayered film detects an external magnetic field.

As described above, the magnetoresistive element of the present invention has the pair of first antiferromagnetic layers in order to align the magnetization direction of the magnetic detecting layer of the multilayered film. The present invention is characterized in that the first antiferromagnetic layers comprise an antiferromagnetic material having higher resistivity than that of the conductive layers and that the conductive layers are superimposed with the corresponding first antiferromagnetic layers and are in contact with the magnetic detecting layer in a range of the predetermined gap.

Since the pair of conductive layers extend over the magnetic layer, the detecting current from the conductive layers effectively flows in the multilayered film without shunts in the first antiferromagnetic layers. Since the first antiferromagnetic layers are composed of the antiferromagnetic material having higher resistivity than that of the conductive layers, the shunts of the detecting current in the first antiferromagnetic layers can be effectively decreased. Moreover, the detecting current does not substantially flow in the dead regions not having the magnetoresistive effect and can effectively flows in a sensitive region having the magnetoresistive effect. As a result, output characteristics are improved compared to conventional magnetoresistive elements.

Preferably, the magnetoresistive element further comprises an insulating layer provided between the pair of conductive layers, each of the side faces of the insulating layer abutting each of the end faces of the conductive layers. The detecting current more adequately flows in the multilayered film.

Preferably, the multilayered film comprises a pinned magnetic layer having a pinned magnetization direction, a nonmagnetic conductive layer, and a free magnetic layer as the magnetic detecting layer having a variable magnetization direction with respect to an external magnetic field, the pair of first antiferromagnetic layers are in contact with the free magnetic layer at the predetermined gap in the track width direction, and the magnetization direction of the free magnetic layer is oriented in a direction which is perpendicular to the magnetization direction of the pinned magnetic layer by exchange anisotropic coupling with the first antiferromagnetic layers.

Preferably, the magnetoresistive element further comprises a pair of ferromagnetic layers provided on both sides of the magnetic detecting layer of the multilayered film, and the ferromagnetic layers are in contact with the corresponding first antiferromagnetic layers.

Preferably, the multilayered film comprises a pinned magnetic layer having a pinned magnetization direction, a nonmagnetic conductive layer, and a free magnetic layer as the magnetic detecting layer having a variable magnetization direction with respect to an external magnetic field, the first antiferromagnetic layers are in contact with the corresponding ferromagnetic layers lying at both sides of the free magnetic layer, and the magnetization direction of the free magnetic layer is oriented in a direction which is perpendicular to the magnetization direction of the pinned magnetic layer by exchange anisotropic coupling with the first antiferromagnetic layers. This magnetoresistive element is referred to as a spin-valve thin-film element.

Preferably in this case, both side regions of the free magnetic layer in the track width direction are thinner than the central region, the ferromagnetic layers are formed on the side regions, and the conductive layers extend over the free magnetic layer. Alternatively, the multilayered film may comprise a second antiferromagnetic layer, the magnetization direction of the pinned magnetic layer is pinned by exchange coupling with the second antiferromagnetic layer, the second antiferromagnetic layer extends in the track width direction than the pinned magnetic layer, the upper faces of the ferromagnetic layers are equal to or higher than the upper face of the free magnetic layer, the ferromagnetic layers are in contact with the corresponding first antiferromagnetic layers, and the first antiferromagnetic layers extend to a position in contact with the free magnetic layer.

Preferably, the first antiferromagnetic layers comprise an antiferromagnetic material having a blocking temperature which is lower than that of the second antiferromagnetic layer. The magnetization of the free magnetic layer is adequately oriented in a direction orthogonal to the magnetization of the pinned magnetic layer.

Preferably, the first antiferromagnetic layers comprise an antiferromagnetic material of an electrically insulating oxide. This material suppresses shunts of the detecting current to the first antiferromagnetic layers. More preferably, the electrically insulating oxide is selected from NiO and $\alpha\text{-Fe}_2\text{O}_3$.

Alternatively, the first antiferromagnetic layers may comprise one of an X—Mn alloy and an X—Mn—X' alloy wherein X is at least one element selected from the group consisting of Pt, Pd, Ir, Rh, Ru, and Os and X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and rare earth elements.

According to another aspect of the present invention, a method for making a magnetoresistive element comprising the steps of:
(a) forming a multilayered film on a substrate by depositing a second antiferromagnetic layer, a pinned magnetic layer, a nonmagnetic conductive layer, and a free magnetic layer, in that order;
(b) forming a lift-off resist layer having cutout sections thereunder on the free magnetic layer;
(c) forming first antiferromagnetic layers on the free magnetic layer;
(d) forming conductive layers on the first antiferromagnetic layers obliquely with respect to the magnetic layer so that the conductive layers extend in the cutout sections of the resist layer, the first antiferromagnetic layers having higher electrical resistivity than that of the conductive layers; and
(e) removing the resist layer on the multilayered film.

In this method, using the lift-off resist, the ferromagnetic layers and the first antiferromagnetic layers are formed on both side of the multilayered film, and the conductive layers are formed obliquely with respect to the multilayered film. This oblique process enables the formation of the conductive layers in the cutout sections of the resist layer. Thus, the resulting conductive layers extend on the free magnetic layer.

Preferably, an insulating layer is formed on the free magnetic layer in the step (a), the lift-off resist layer is formed on the insulating layer in the step (b), the method further comprises the step (f) of etching both side faces in the track width direction of the insulating layer to expose the surface of the free magnetic layer between the step (b) and the step (c), and each of end faces of the conductive layers is put into contact with each of the side faces of the insulating layer in the step (d).

In the step (c), ferromagnetic layers may be formed on both sides of at least the free magnetic layer. Thus, the first antiferromagnetic layers are formed on the corresponding ferromagnetic layers.

Preferably, in the step (c), the thickness of the free magnetic layer is reduced in both side regions in the track width direction, and the ferromagnetic layers are formed on the side regions.

Preferably, in the step (c), the both sides in the track width direction of the multilayered film are etched so that the second antiferromagnetic layer is exposed, and the ferromagnetic layers are formed on the second antiferromagnetic layer so that the upper faces of the ferromagnetic layers are equal to or higher than the upper face of the free magnetic layer.

Preferably, in the step (c), the substrate provided with the magnetic layer is placed vertically with respect to a target, and the first antiferromagnetic layers are formed by one of an ion-beam sputtering process, a long-throw sputtering process, and a collimation sputtering process, and, in the step (d), the substrate is tilted with respect to a target having a composition for the conductive layers or the target is tilted with respect to the substrate, and the ferromagnetic layers as the optional layers and the conductive layers are formed on the first antiferromagnetic layers and in the cutout sections of the lift-off resist by one of an ion-beam sputtering process, a long-throw sputtering process, and a collimation sputtering process.

Preferably, the first antiferromagnetic layers comprise an antiferromagnetic material having a blocking temperature which is lower than that of the second antiferromagnetic layer. The magnetization of the free magnetic layer is adequately oriented in a direction orthogonal to the magnetization of the pinned magnetic layer.

Preferably, the first antiferromagnetic layers comprise an antiferromagnetic material of an electrically insulating oxide. More preferably, the electrically insulating oxide is selected from NiO and $\alpha$-$Fe_2O_3$.

Alternatively, the first antiferromagnetic layers may comprise one of an X—Mn alloy and an X—Mn—X' alloy wherein X is at least one element selected from the group consisting of Pt, Pd, Ir, Rh, Ru, and Os and X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and rare earth elements.

DESCRIPTION OF THE PREFERRED EMBODIMENTS

Figure 1:
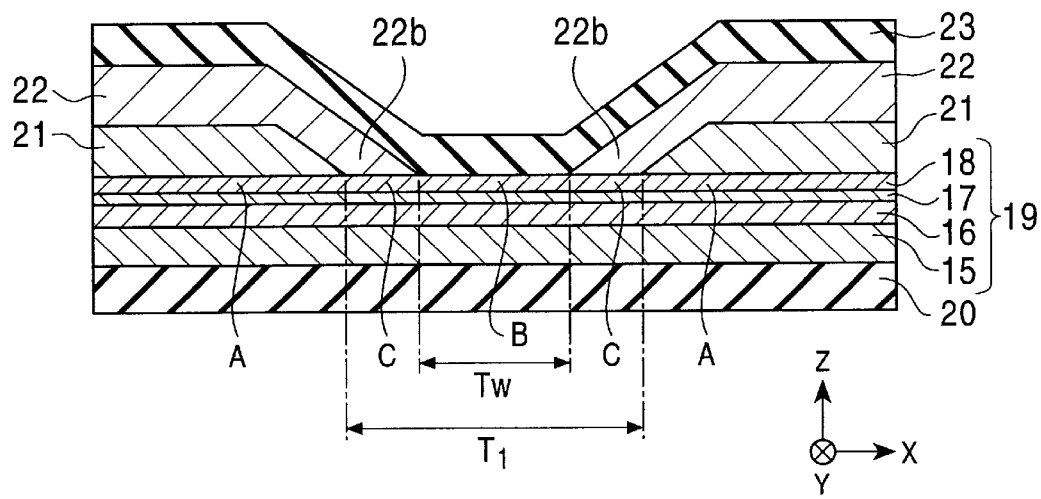
FIG. 1 is a partial cross-sectional view of a magnetoresistive element in accordance with a first embodiment of the present invention.

FIG. 1 is a cross-sectional view at an air bearing surface (ABS) of a magnetoresistive element in accordance with a first embodiment of the present invention. FIG. 1 includes a central fragment of the element in the X direction. This magnetoresistive element is called a spin-valve thin-film element which is one of giant magnetoresistive (GMR) elements using a giant magnetoresistive effect, and detects a recorded magnetic field from magnetic media such as a hard disk. This spin-valve thin-film element is mounted on the tip of the trailing side of a floating slider of a hard disk drive and detects a recorded magnetic field from the hard disk. Herein, the hard disk moves in the Z direction and the fringing magnetic field from the magnetic recording medium is generated in the Y direction in the drawing.

The spin-valve thin-film element shown in FIG. 1 has a multilayered film 19 including four layers of a second antiferromagnetic layer 15, a pinned magnetic layer 16, a nonmagnetic layer 17, and a free magnetic layer 18 as a magnetic detecting layer.

A lower gap layer 20 composed of an insulating material such as alumina ($Al_2O_3$) is formed under the second antiferromagnetic layer 15. An underlayer composed of a nonmagnetic material such as tantalum (Ta) may be formed between the lower gap layer 20 and the second antiferromagnetic layer 15. An upper gap layer 23 composed of an insulating material such as alumina is formed on a conductive layer 22.

The pinned magnetic layer 16 is in contact with the second antiferromagnetic layer 15. When these layers are annealed in a magnetic field, an exchange anisotropic magnetic field is generated at the interface between the second antiferromagnetic layer 15 and the pinned magnetic layer 16 by exchange coupling, and the magnetization of the pinned magnetic layer 16 is fixed in the Y direction in the drawing.

In the present invention, the second antiferromagnetic layer 15 is preferably formed of a platinum-manganese (Pt—Mn) alloy which has high corrosion resistance and a high blocking temperature compared to conventional antiferromagnetic materials, such as F—Mn alloys and Ni—Mn alloys. Moreover, this alloy has a large exchange anisotropic magnetic field $H_{ex}$. Thus, this alloy exhibits superior properties as antiferromagnetic material. The Pt—Mn alloy may be replaced with an X—Mn alloy wherein X is at least one element selected from Pd, Ir, Rh, and Ru, or a Pt—Mn—X' alloy wherein X' is at least one selected from Pd, Ir, Rh, Ru, Au, and Ag.

The pinned magnetic layer 16 and the free magnetic layer 18 is composed of a nickel-iron (Ni—Fe) alloy, metallic cobalt (Co), an iron-cobalt (Fe—Co) alloy, an iron-cobalt-nickel (Fe—Co—Ni) alloy, or a cobalt-nickel (Co—Ni) alloy. The nonmagnetic layer 17 is composed of a nonmagnetic conductive material having low resistivity such as copper (Cu).

As shown in FIG. 1, a pair of first antiferromagnetic layers 21 is formed on the free magnetic layer 18 at a gap $T_1$ in the track width direction (X direction). That is, the free magnetic layer 18 is in contact with the first antiferromagnetic layers 21 in both side regions A in the track width direction (X direction). An exchange anisotropic magnetic field is generated at the interface between the first antiferromagnetic layers 21 and the free magnetic layer 18 by the exchange coupling. The magnetization in the side regions A of the free magnetic layer 18 is fixed in the track width direction (X direction) by the exchange anisotropic magnetic field, whereas the magnetization in the central region B of the free magnetic layer 18 is oriented in the X direction by the bias magnetic field in the X direction from the side regions A. The magnetization direction in the central region B is varied by an external magnetic field.

In this spin-valve thin-film element, the exchange anisotropic magnetic field which is generated at the interface to the first antiferromagnetic layers 21 determines the magnetization directions of the pinned magnetic layer 16 and the free magnetic layer 18. In such a structure, the first antiferromagnetic layers 21 must be formed of an antiferromagnetic material having a lower blocking temperature than that of the material for the second antiferromagnetic layer 15, as described below in a production method. The first antiferromagnetic layers 21 and the second antiferromagnetic layer 15 may be composed of different materials having different blocking temperatures, or may be composed of materials containing the same component having different ratios so that these materials have different blocking temperatures.

The use of the antiferromagnetic material having a lower blocking temperature in the first antiferromagnetic layers 21 facilitates magnetization of the free magnetic layer 18 in contact with the first antiferromagnetic layers 21 in the X direction.

A protective layer composed of, for example, tantalum (Ta) may be provided on the free magnetic layer 18 between the first antiferromagnetic layers 21.

Conductive layers 22 composed of, for example, chromium (Cr) are formed on the first antiferromagnetic layers 21. As shown in FIG. 1, the conductive layer 22 extends over the first antiferromagnetic layers 21 and the free magnetic layer 18 which is exposed at the gap between the conductive layer 22. The first antiferromagnetic layers 21 are composed of an antiferromagnetic material having higher resistivity than that of a material for the conductive layers 22. For example, the first antiferromagnetic layers 21 are preferably composed of an electrically insulating oxide-based antiferromagnetic material. Preferable examples of such materials include NiO and $\alpha\text{-Fe}_2\text{O}_3$.

Alternatively, the first antiferromagnetic layers 21 may be composed of an X—Mn alloy wherein X is at least one element selected from the group consisting of Pt, Pd, Ir, Rh, Ru, and Os, or an X—Mn—X' alloy wherein X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and rare earth elements.

Since the first antiferromagnetic layers 21 are composed of an antiferromagnetic material having a lower blocking temperature than that of the material for the second antiferromagnetic layer 15 to optimize the magnetization direction of the free magnetic layer 18, the antiferromagnetic material for the first antiferromagnetic layers 21 is determined in view of both the resistivity and the blocking temperature. The above-mentioned materials for the first antiferromagnetic layers 21 have higher resistivities than that of the material for the conductive layers 22.

As described above, the pair of conductive layers 22 extends over the first antiferromagnetic layers 21 and the free magnetic layer 18, and the first antiferromagnetic layers 21 are composed of an antiferromagnetic material having higher resistivity than that of the conductive layers 22. Thus, a detecting current from the conductive layers 22 is barely shunted to the first antiferromagnetic layers 21. As a result, the detecting current effectively flows in the free magnetic layer 18, the nonmagnetic layer 17, and the pinned magnetic layer 16. When the first antiferromagnetic layers 21 are composed of an electrically insulating oxide such as NiO, the shunt current in the first antiferromagnetic layers 21 is substantially zero. Thus, the detection sensitivity and the read output are high.

In conventional technology, the track width Tw is defined by the distance between the first antiferromagnetic layers 21, that is, the width $T_1$ of the central region B of the free magnetic layer 18. In contrast, the conductive layers 22 on the first antiferromagnetic layers 21 extend to the upper portions of the free magnetic layer 18, and the gap between the conductive layers 22 defines the track width Tw. This track width Tw is called a magnetic read track width (M-Tw) and actually contributes to the magnetoresistive effect.

In the definition of the track width Tw by the gap between the conductive layers 22, the detecting current does not substantially flow in the dead regions C not having the magnetoresistive effect and can effectively be concentrated in the sensitive region having the substantial magnetoresistive effect. The dead regions C are parts, in the vicinities of the side regions A, of the central region B of the free magnetic layer 18. Thus, the sensitive region is the central region B other than the dead regions C. In the sensitive region, the pinned magnetic layer 16 is appropriately magnetized in the Y direction, and the free magnetic layer 18 is appropriately magnetized in the X direction. Thus, the magnetization of the pinned magnetic layer 16 and the magnetization of the free magnetic layer 18 are orthogonal. The magnetization of the free magnetic layer 18 sensitively responds to the external magnetic field from the recording medium, and the resistivity is varied by the relationship between the variable magnetization of the free magnetic layer 18 and the pinned magnetization of the pinned magnetic layer 16. Thus, the fringing magnetic field from the recording medium is detected as a change in voltage due to the change in the resistivity.

This sensitive region substantially contributes to the magnetoresistive effect and has a read function. In contrast, in the dead regions C, the free magnetic layer 18 is firmly magnetized in the X direction by the strong bias magnetic field due to the exchange anisotropic magnetic field generated between the free magnetic layer 18 and the first antiferromagnetic layers 21, and is barely changed by the external magnetic field. Accordingly, the dead regions C exhibit a decreased magnetoresistive effect and a decreased read function.

The width of the dead regions C can be determined by, for example, a microtrack profile method. In the microtrack profile method, a predetermined signal is recorded on a fine track on a recording medium, and a magnetoresistive element is scanned on the fine track in the track width direction to measure the read output.

According to the results by this method, the read output is high in the center of the multilayered film 19 and is low on both sides of the multilayered film 19. The results suggest that the center of the multilayered film 19 effectively contributes to the magnetoresistive effect and has a high read function while the sides of the multilayered film 19 exhibit reduced magnetoresistive effects and reduced output functions. For example, a region having a read output which is 50% or more of the maximum read output is defined as the sensitive region, whereas regions having a read output which is less than 50% of the maximum read output is defined as the dead regions. When the dead regions C are determined by the microtrack profile method, it is preferable to control the detecting current so that the detecting current directly flows in the sensitive region and does not flow in the dead regions C as much as possible.

As described above, in the first embodiment, the conductive layers 22 extend the first antiferromagnetic layers 21 and the dead regions C of the free magnetic layer 18. Thus, the detecting current from the conductive layers 22 directly flows in the sensitive region (the central region B other than the dead regions C), and the read output is improved.

Figure 2:
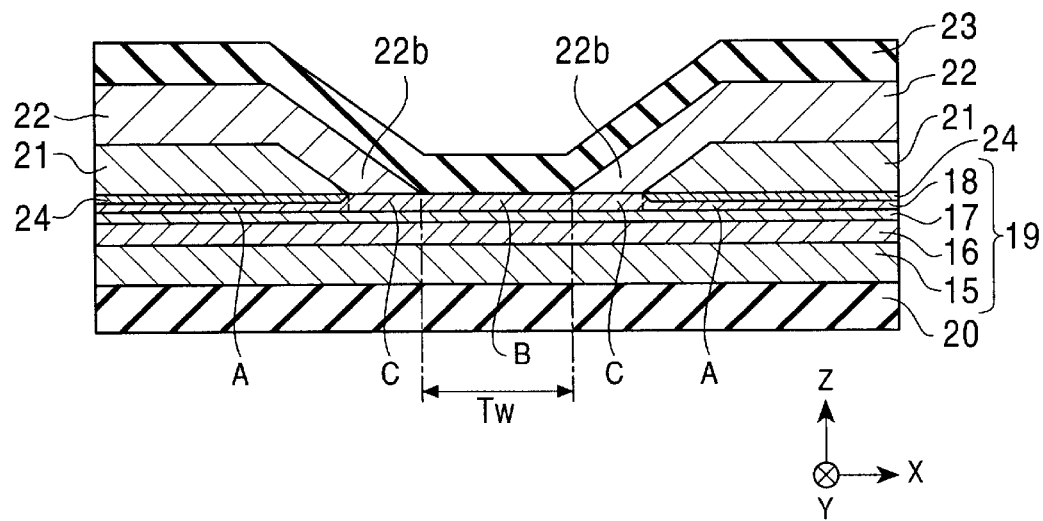
FIG. 2 is a partial cross-sectional view of a magnetoresistive element in accordance with a second embodiment of the present invention.

FIG. 2 is a partial cross-sectional view at an air bearing surface (ABS) of a magnetoresistive element in accordance with a second embodiment of the present invention. This spin-valve thin-film element also has a multilayered film 19 including four layers of a second antiferromagnetic layer 15, a pinned magnetic layer 16, a nonmagnetic layer 17, and a free magnetic layer 18 as a magnetic detecting layer, which are formed on a lower gap layer 20.

In the second embodiment, shown in FIG. 2, both side regions A of the free magnetic layer 18 are thinner than the central region B, and ferromagnetic layers 24 are formed on the side regions A. It is preferable that the upper faces of the ferromagnetic layers 24 and the upper face of the free magnetic layer 18 have a common flat surface.

The ferromagnetic layers 24 are composed of, for example, a Ni—Fe alloy, metallic cobalt, an Fe—Co alloy, an Fe—Co—Ni alloy, or a Co—Ni alloy. The ferromagnetic layers 24 may be composed of the same material or a different material from that for the free magnetic layer 18. The ferromagnetic layers 24 may have a single-layer configuration or a multi-layer configuration.

As shown in FIG. 2, first antiferromagnetic layers 21 are formed on the ferromagnetic layers 24. By annealing in a magnetic field, exchange anisotropic magnetic fields are generated between the ferromagnetic layers 24 and the first antiferromagnetic layers 21 and between the side regions A of the free magnetic layer 18 and the first antiferromagnetic layers 21 so that the ferromagnetic layers 24 and the side regions A of the free magnetic layer 18 are magnetized in the track width direction (X direction). Moreover, A bias magnetic field in the X direction generated from the ferromagnetic layers 24 and the side regions A of the free magnetic layer 18 magnetizes the central region B of the free magnetic layer 18 in the X direction.

The ferromagnetic layers 24 prevents the atmospheric oxidation of the surface of the free magnetic layer 18 before the first antiferromagnetic layers 21 are formed. If the oxide film is formed on the free magnetic layer 18, an adequate exchange anisotropic magnetic field may not be generated between the first antiferromagnetic layers 21 and the free magnetic layer 18. In the present invention, the free magnetic layer 18 is formed, both side regions A of the free magnetic layer 18 are slightly etched, and the ferromagnetic layers 24 and the first antiferromagnetic layers 21 are formed by a continuous deposition process to prevent the surface oxidation of the free magnetic layer 18.

As shown in FIG. 2, conductive layers 22 are formed on the first antiferromagnetic layers 21 and extend over the free magnetic layer 18. The first antiferromagnetic layers 21 are formed of an antiferromagnetic material having higher resistivity than that of the conductive layers 22. In this configuration, the detecting current from the conductive layer 22 can be adequately concentrated to the free magnetic layer 18, the nonmagnetic layer 17, and the pinned magnetic layer 16 without shunts to the first antiferromagnetic layers 21.

When the conductive layers 22 extends over the dead regions C on the multilayered film 19, the detecting current can effectively flows in the sensitive region (the dead regions C other than the dead regions C) which substantially contributes to the magnetoresistive effect, resulting in further improved read output.

Figure 3:
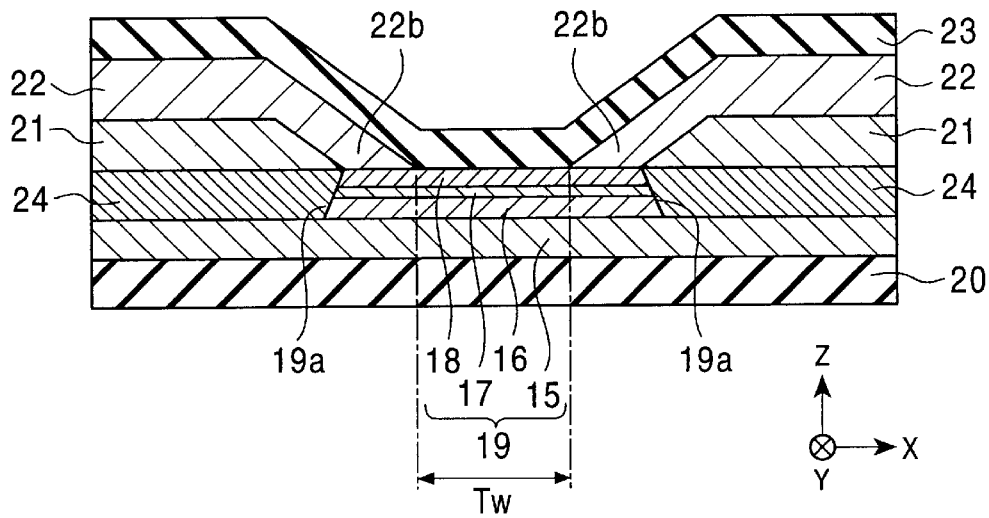
FIG. 3 is a partial cross-sectional view of a magnetoresistive element in accordance with a third embodiment of the present invention.

FIG. 3 is a partial cross-sectional view at an air bearing surface (ABS) of a magnetoresistive element in accordance with a third embodiment of the present invention. This spin-valve thin-film element also has a multilayered film 19 including four layers of a second antiferromagnetic layer 15, a pinned magnetic layer 16, a nonmagnetic layer 17, and a free magnetic layer 18 as a magnetic detecting layer, which are formed on a lower gap layer 20.

As shown in FIG. 3, the three layers of the pinned magnetic layer 16, the nonmagnetic layer 17, and the free magnetic layer 18 have a trapezoidal cross-section having sloping sides 19a, whereas the second antiferromagnetic layer 15 extends in the X direction under these three layers.

Moreover, ferromagnetic layers 24 are formed on the second antiferromagnetic layer 15 at both sides of these three layers. In FIG. 3, the upper faces of the ferromagnetic layers 24 and the upper face of the free magnetic layer 18 form a common flat surface. In general, the upper faces of the ferromagnetic layers 24 must be equal to or higher than the upper face of the free magnetic layer 18.

Moreover, first antiferromagnetic layers 21 are formed on the ferromagnetic layers 24. By annealing in a magnetic field, an exchange anisotropic magnetic field is generated between the first antiferromagnetic layers 21 and the ferromagnetic layers 24 so as to magnetize the ferromagnetic layers 24 in the track width direction (X direction). A bias magnetic field in the X direction from the ferromagnetic layers 24 magnetizes the free magnetic layer 18 in the X direction.

In this embodiment, the ferromagnetic layers 24 and the first antiferromagnetic layers 21 can be continuously formed by a sputtering process. Since the thickness of the ferromagnetic layers 24 is relatively large, the bias magnetic field from the ferromagnetic layers 24 is relatively large and can adequately magnetize the free magnetic layer 18 in the X direction.

In this embodiment, the conductive layers 22 are formed on the first antiferromagnetic layers 21 and the first antiferromagnetic layers 21 are composed of an antiferromagnetic material having higher resistivity than that of the conductive layers 22. Moreover, the conductive layers 22 extend over the free magnetic layer 18. Thus, the detecting current from the conductive layer 22 can be concentrated to the free magnetic layer 18, the nonmagnetic layer 17, and the pinned magnetic layer 16 without shunts to the first antiferromagnetic layers 21, resulting in further improved read output.

When the conductive layers 22 extend to the dead regions C in the multilayered film 19, as shown in FIG. 1, the detecting current can effectively flows in the sensitive region having the magnetoresistive effect, resulting in improved read output.

Preferably, a nonmagnetic spacer composed of, for example, chromium is provided between the ferromagnetic layers 24 and the second antiferromagnetic layer 15. The nonmagnetic spacer prevents exchange coupling between the ferromagnetic layers 24 and the second antiferromagnetic layer 15. Thus, the ferromagnetic layers 24 are adequately exchange-coupled only with the first antiferromagnetic layers 21 to generate an exchange coupling magnetic field.

Figure 4:
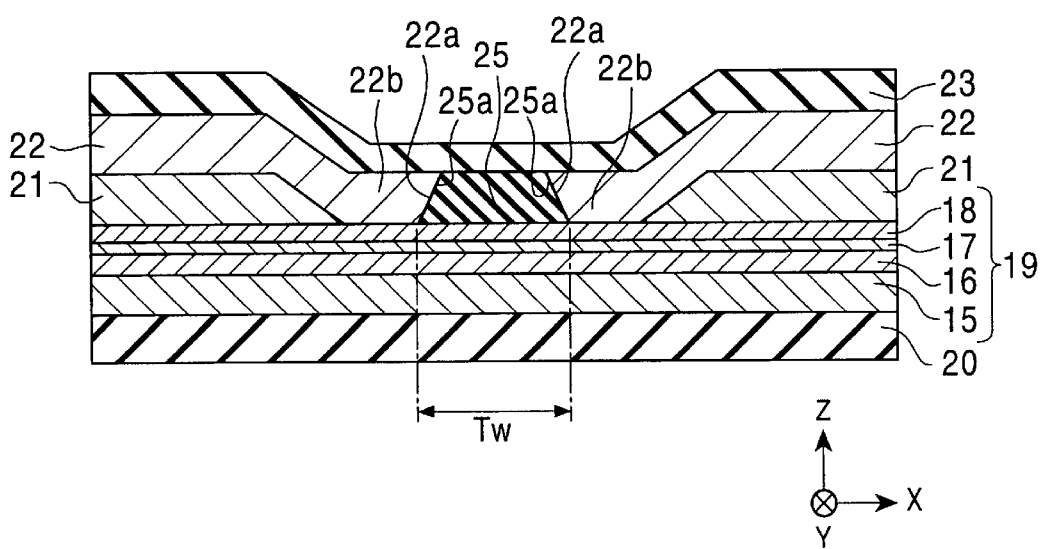
FIG. 4 is a partial cross-sectional view of a magnetoresistive effect in accordance with a fourth embodiment of the present invention.
Figure 5:
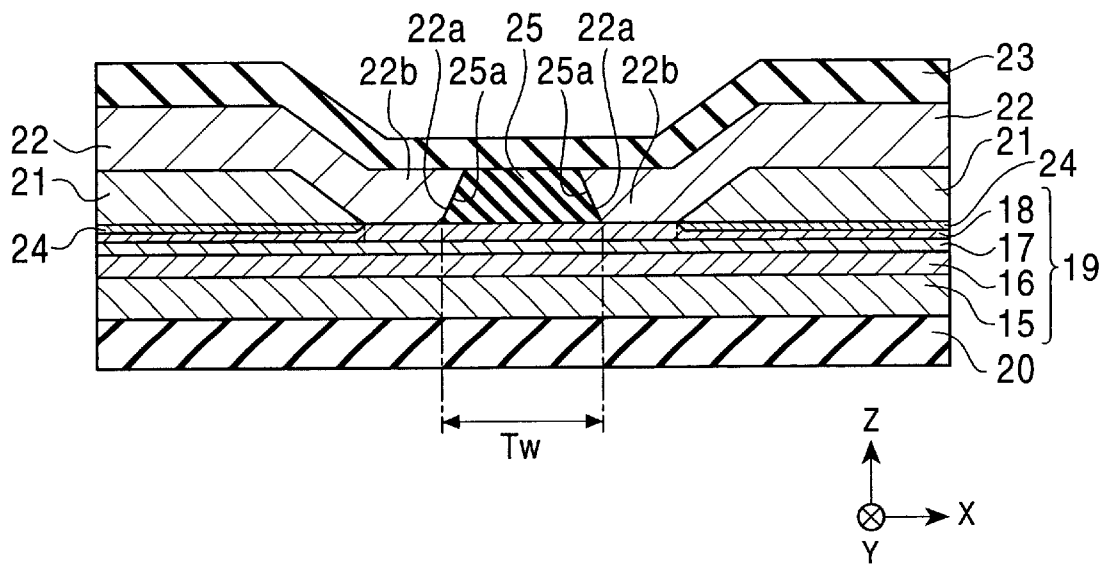
FIG. 5 is a partial cross-sectional view of a magnetoresistive effect in accordance with a fifth embodiment of the present invention.
Figure 6:
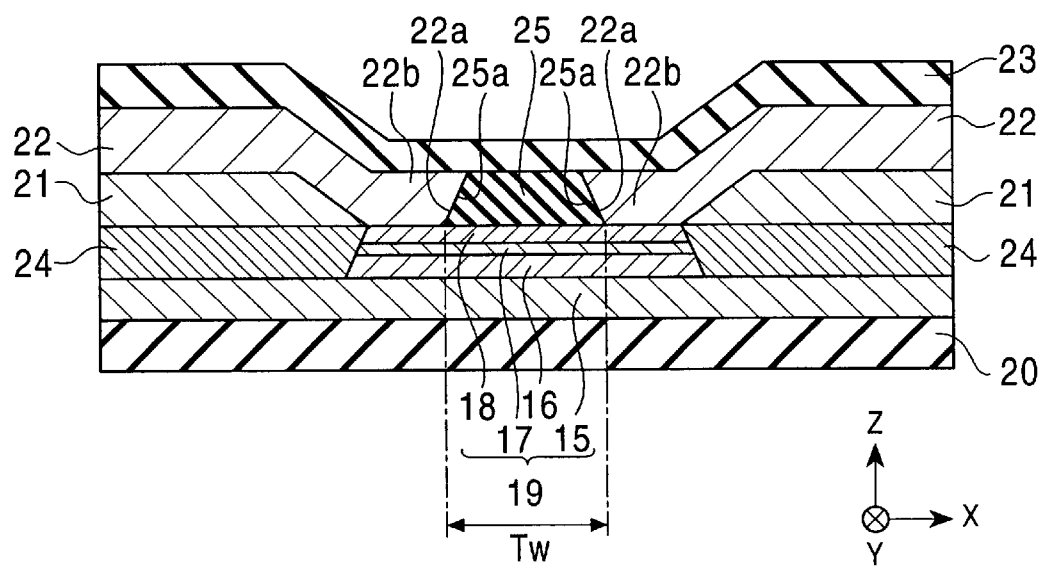
FIG. 6 is a partial cross-sectional view of a magnetoresistive effect in accordance with a sixth embodiment of the present invention.

FIG. 4 is a partial cross-sectional view of a magnetoresistive effect in accordance with a fourth embodiment which is a modification of the magnetoresistive element shown in FIG. 1, FIG. 5 is a partial cross-sectional view of a magnetoresistive effect in accordance with a fifth embodiment which is a modification of the magnetoresistive element shown in FIG. 2; and FIG. 6 is a partial cross-sectional view of a magnetoresistive effect in accordance with a sixth embodiment which is a modification of the magnetoresistive element shown in FIG. 3.

In each of the magnetoresistive elements shown in FIGS. 4 to 6, an insulating layer 25 is formed on the free magnetic layer 18. The insulating layer 25 is composed of an insulating material, for example, $Al_2O_3$, $SiO_2$, $Ti_2O_3$, TiO, and WO. The bottom face of the insulating layer 25 defines the track width Tw.

As shown in FIGS. 4 to 6, a pair of conductive layers 22 extends over the first antiferromagnetic layers 21 to the free magnetic layer 18, and the end faces 22a thereof abut both side faces 25a of the insulating layer 25.

The insulating layer 25 prevents the diminution of the conductive layers 22 on the free magnetic layer 18 at the edges so that the conductive layers 22 can maintain adequate thicknesses up to the boundaries between the sensitive region and the dead regions. In such a configuration, the detecting current can effectively flow in the sensitive region of the multilayered film 19.

In each of the embodiments shown in FIGS. 1 to 3, the edges 22b of the conductive layers 22 on the free magnetic layer 18 are tapered. In this case, the detecting current from the conductive layers 22 does not adequately flow in the edges 22b, but in the midstream toward the multilayered film 19. That is, the detecting current from the conductive layers 22 flows in the dead regions C, which substantially does not have magnetoresistive effect, and then the sensitive region, resulting in generation of noise and decreased output characteristics.

Moreover, in each of the embodiments shown in FIGS. 1 to 3, the edges 22b of the conductive layers 22 may extend over the sensitive region across the dead regions C by reason of a production process. When the conductive layers 22 overlap the sensitive region, the sensitive region substantially loses the function as the sensitive region, and the effective sensitive region is reduced. The noneffective portions of the sensitive region generate noise and result in decreased read output like the dead regions C.

In each of the embodiments shown in FIGS. 4 to 6, the bottom face of the insulating layer 25 defines the track width Tw which is equal to or is slightly larger than the width of the sensitive region. Moreover, the edges 22b of the conductive layers 22 which abut the side faces 25a of the insulating layer 25 are thick so that the detecting current adequately flows in the edges 22b of the conductive layers 22. In addition, the insulating layer 25 prevents extending the conductive layers 22 over the sensitive region, and the output characteristics are stable.

In the embodiments shown in FIGS. 4 to 6, it is preferable that the first antiferromagnetic layers 21 be preferably formed of an antiferromagnetic material having larger resistivity than that of the conductive layer 22 and the conductive layers 22 extend over the free magnetic layer 18, so that the detecting current from the conductive layers 22 adequately flows in the free magnetic layer 18, the nonmagnetic layer 17, and the pinned magnetic layer 16 without shunts to the first antiferromagnetic layers 21. The read output is, therefore, improved.

Since the conductive layers 22 do not extend to the sensitive region due to blocking by the insulating layer 25, the detecting current effectively flows in the entire sensitive region having the magnetoresistive effect, resulting in more effective improvement in the read output.

In the embodiment shown in FIG. 6, a nonmagnetic spacer is preferably provided between the ferromagnetic layers 24 and the second antiferromagnetic layer 15.

Figure 7:
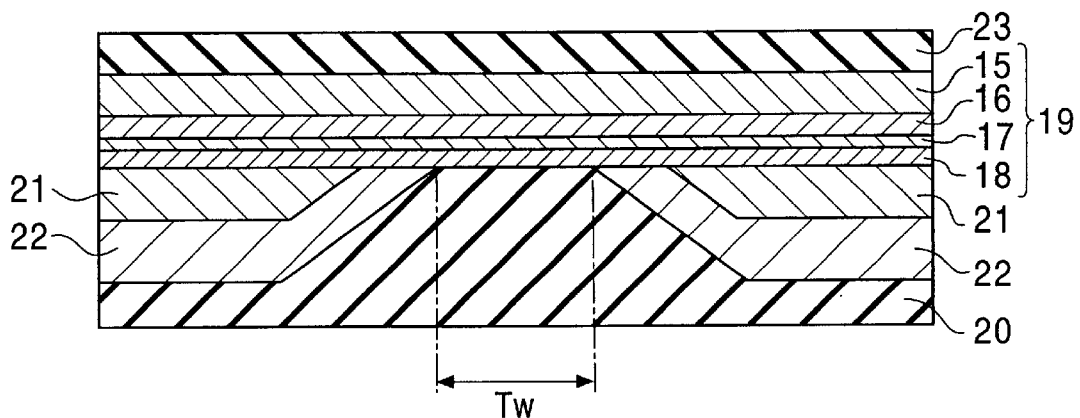
FIG. 7 is a partial cross-sectional view of a magnetoresistive element in accordance with a seventh embodiment of the present invention.
Figure 8:
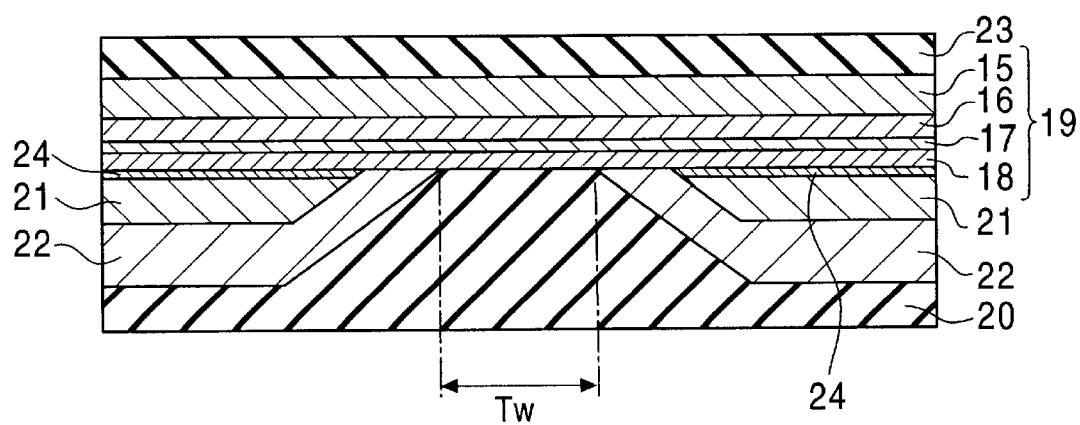
FIG. 8 is a partial cross-sectional view of a magnetoresistive element in accordance with an eighth embodiment of the present invention.
Figure 9:
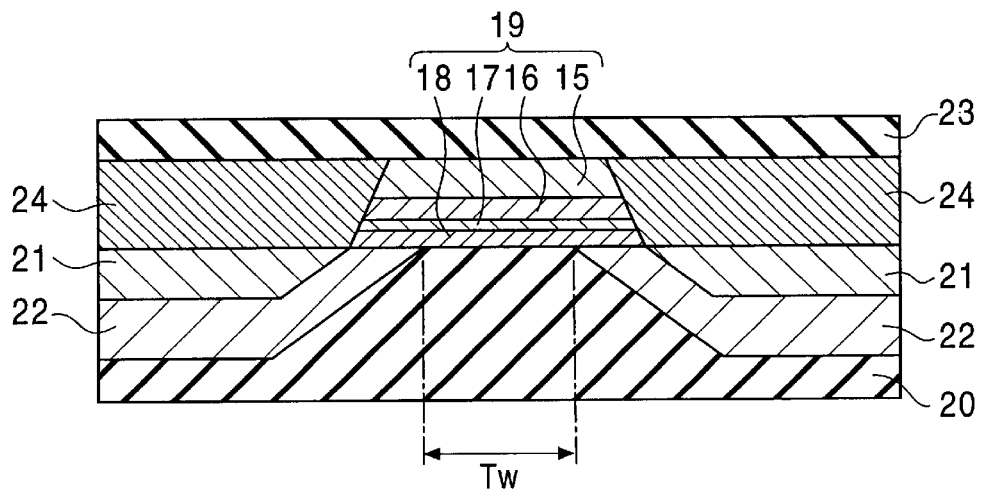
FIG. 9 is a partial cross-sectional view of a magnetoresistive element in accordance with a ninth embodiment of the present invention.

FIG. 7 is a partial cross-sectional view of a magnetoresistive element in accordance with a seventh embodiment in which layers are deposited in reverse order with respect to the magnetoresistive element shown in FIG. 1, FIG. 8 is a partial cross-sectional view of a magnetoresistive element in accordance with an eighth embodiment in which layers are deposited in reverse order with respect to the magnetoresistive element shown in FIG. 2, and FIG. 9 is a partial cross-sectional view of a magnetoresistive element in accordance with a ninth embodiment in which layers are deposited in reverse order with respect to the magnetoresistive element shown in FIG. 3. Materials used in these magnetoresistive elements are the same as those in the magnetoresistive elements shown in FIGS. 1 to 3.

In the magnetoresistive element shown in FIG. 7, a pair of conductive layers 22 and a pair of first antiferromagnetic layers 21 are formed on a lower gap layer 20, the edge portions of the conductive layers 22 extend upwardly, and the edge portions and the upper faces of the first antiferromagnetic layers 21 form a common flat plane.

A free magnetic layer 18 as a magnetic sensing film, a nonmagnetic layer 17, a pinned magnetic layer 16, and a second antiferromagnetic layer 15 are formed over the first antiferromagnetic layers 21 and the conductive layers 22, and these four layers 18, 17, 16, and 15 constitute a multilayered film 19. An upper gap layer 23 is formed on the second antiferromagnetic layer 15.

In the magnetoresistive element shown in FIG. 8, a pair of conductive layers 22 and a pair of first antiferromagnetic layers 21 are formed on a lower gap layer 20, ferromagnetic layers 24 are formed on the first antiferromagnetic layers 21, and the edge portions of the conductive layers 22 extend upwardly, and the edge portions and the upper faces of the ferromagnetic layers 24 form a common flat plane.

A free magnetic layer 18 as a magnetic sensing film, a nonmagnetic layer 17, a pinned magnetic layer 16, and a second antiferromagnetic layer 15 are formed over the ferromagnetic layers 24 and the conductive layers 22, and these four layers 18, 17, 16, and 15 constitute a multilayered film 19. An upper gap layer 23 is formed on the second antiferromagnetic layer 15.

In the magnetoresistive element shown in FIG. 9, a pair of conductive layers 22 and a pair of first antiferromagnetic layers 21 are formed on a lower gap layer 20, the edge portions of the conductive layers 22 extend upwardly, and the edge portions and the upper faces of the first antiferromagnetic layers 21 form a common flat plane.

A free magnetic layer 18 as a magnetic sensing film, a nonmagnetic layer 17, a pinned magnetic layer 16, and a second antiferromagnetic layer 15 are formed over the conductive layers 22, and these four layers 18, 17, 16, and 15 constitute a multilayered film 19. Ferromagnetic layers 24 are formed on both sides of the multilayered film 19 on the first antiferromagnetic layers 21. An upper gap layer 23 is formed over the multilayered film 19 and the ferromagnetic layers 24.

In each of the embodiments shown in FIGS. 7 to 9, the first antiferromagnetic layers 21 are composed of an antiferromagnetic material having higher resistivity than that of the conductive layers 22, and the conductive layers 22 extend under the free magnetic layer 18. Thus, the detecting current from the conductive layers 22 effectively flows in the free magnetic layer 18, the free magnetic layer 18, and the pinned magnetic layer 16 without shunts to the first antiferromagnetic layers 21. The read output is, therefore, improved.

Preferably, the conductive layers 22 extend under the dead regions in the multilayered film 19 so that the detecting current effectively flows in the sensitive region having the substantial magnetoresistive effect. Thus, the read output is more effectively improved.

In the embodiments shown in FIGS. 7 to 9, an insulating layer 25 may be formed between the pair of conductive layers 22, as in the embodiments shown in FIGS. 4 to 6.

Figure 10:
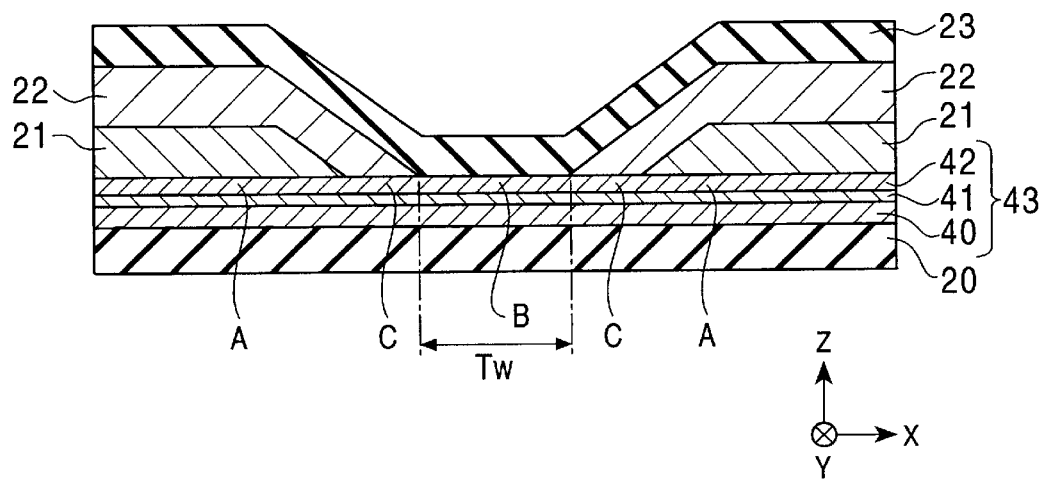
FIG. 10 is a cross-sectional view of a tenth embodiment of the magnetoresistive element in accordance with the present invention.

FIG. 10 is a cross-sectional view of a tenth embodiment of the magnetoresistive element in accordance with the present invention. In this embodiment, a multilayered film 43 of a soft magnetic layer (soft adjacent layer: SAL layer) 40, a nonmagnetic layer (SHUNT layer) 41, and a magnetoresistive layer (MR layer) 42 as a magnetic sensing film is formed on a lower gap layer 20. For example, the soft magnetic layer 40 is composed of a Fe—Ni—Nb alloy, the nonmagnetic layer 41 is composed of tantalum, and the magnetoresistive layer 42 is composed of a NiFe alloy.

A pair of first antiferromagnetic layers 21 are formed on the magnetoresistive layer 42 at a predetermined gap defining the track width Tw in the track width direction (X direction), and conductive layers 22 are formed on the first antiferromagnetic layers 21. Moreover, an upper gap layer 23 is formed over the conductive layers 22 and the magnetoresistive layer 42.

Also, in this embodiment, the first antiferromagnetic layers 21 is composed of an antiferromagnetic material having larger resistivity than that of the conductive layers 22. For example, the first antiferromagnetic layers 21 are preferably composed of an antiferromagnetic material of an electrically insulating oxide. Preferable electrically insulating oxides are NiO and $\alpha$-$Fe_2O_3$.

Alternatively, the first antiferromagnetic layers 21 may be composed of an X—Mn alloy wherein X is at least one element selected from the group consisting of Pt, Pd, Ir, Rh, Ru, and Os, or an X—Mn—X' alloy wherein X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and rare earth elements.

The conductive layers 22 on the first antiferromagnetic layers 21 are composed of, for example, chromium. Since the conductive layers 22 extend over the magnetoresistive layer 42, the detecting current from the conductive layers 22 adequately flows in the magnetoresistive layer 42 without shunts to the first antiferromagnetic layers 21. The read output is, therefore, improved. It is preferable that the conductive layers 22 extends over the dead regions C of the magnetoresistive layer 42 so that the detecting current effectively flows in the sensitive region having the substantial magnetoresistive resistive effect to more effectively improve the read output.

As shown in FIG. 10, the first antiferromagnetic layers 21 are in contact with the magnetoresistive layer 42. An exchange anisotropic magnetic field generated at an interface between the first antiferromagnetic layers 21 and the magnetoresistive layer 42 magnetizes the side regions A of the magnetoresistive layer 42 under the first antiferromagnetic layers 21 in the X direction.

A bias magnetic field from the side regions A magnetizes the central region B of the magnetoresistive layer 42 in the Y direction. The current magnetic field formed when a detecting current flows in the magnetoresistive layer 42 is applied to the soft magnetic layer 40 in the Y direction so that a transverse bias magnetic field is applied to the single-domain central region B of the magnetoresistive layer 42 in the Y direction by the magnetostatic coupling energy induced by the soft magnetic layer 40. By the transverse bias magnetic field in the single-domain central region B of the magnetoresistive layer 42, a change in resistance with respect to a change in the magnetic field in the central region B (magnetoresistive characteristic: H-R characteristic) has linearity.

Also, in this embodiment, the side regions A of the magnetoresistive layer 42 may be slightly etched, and ferromagnetic layers 24 may be formed on the thinned side regions A, as in FIG. 2.

Moreover, an insulating layer 25 may be formed between the conductive layers 22, as in FIGS. 4 to 6. The conductive layers 22, thereby, have a large thickness at the edges so that the detecting current adequately flows in the edge portion. The insulating layer 25 blocks extension of the conductive layer 22 to the sensitive region, resulting in stable read characteristics.

Figure 11:
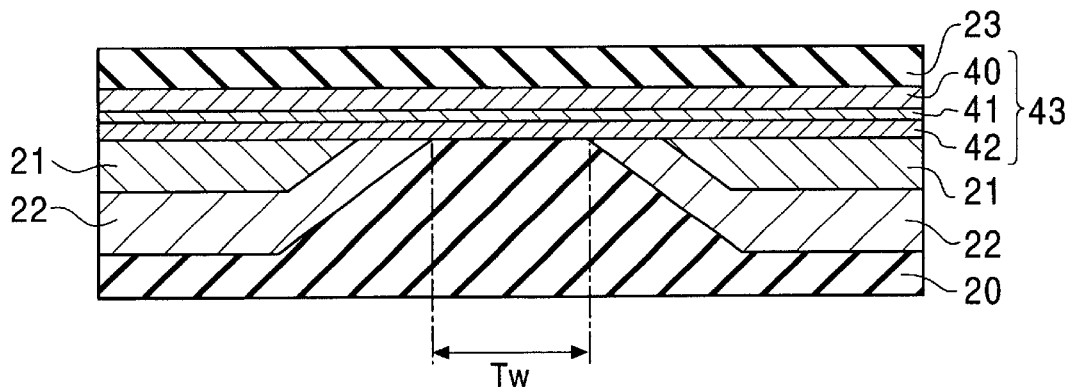
FIG. 11 is a partial cross-sectional view of an eleventh embodiment of the magnetoresistive element in accordance with the present invention.

FIG. 11 is a partial cross-sectional view of a magnetoresistive element in which layers are deposited in reverse order with respect to the AMR thin-film element shown in FIG. 10. A pair of conductive layers 22 and a pair of first antiferromagnetic layers 21 are formed on a lower gap layer 20, the edge portions of the conductive layers 22 extend upwardly, and the edge portions and the upper faces of the first antiferromagnetic layers 21 form a common flat plane.

A multilayered film 43 having three layers of a magnetoresistive layer 42 as a magnetic sensing film, a nonmagnetic layer 41, and soft magnetic layer 40 is formed over the first antiferromagnetic layers 21 and the conductive layers 22. An upper gap layer 23 is formed on the soft magnetic layer 40.

In the embodiment shown in FIG. 11, the first antiferromagnetic layers 21 are composed of an antiferromagnetic material having higher resistivity than that of the conductive layers 22, and the conductive layers 22 extend under the magnetoresistive layer 42. Thus, the detecting current from the conductive layers 22 adequately flows in the magnetoresistive layer 42 without shunts to the first antiferromagnetic layers 21. The read output is, therefore, improved. It is preferable that the conductive layers 22 extends under the dead regions C of the multilayered film 43 so that the detecting current effectively flows in the sensitive region having the substantial magnetoresistive resistive effect to more effectively improve the read output. Moreover, an insulating layer 25 may be formed between the conductive layers 22, as in FIGS. 4 to 6.

Figure 12:
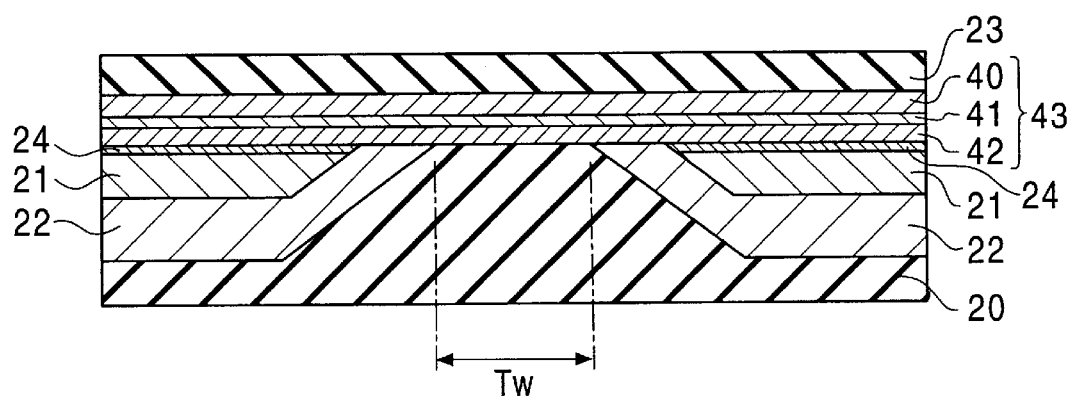
FIG. 12 is a cross-sectional view of a twelfth embodiment of the magnetoresistive element in accordance with the present invention.

FIG. 12 is a cross-sectional view of a modification of the embodiment shown in FIG. 11. In this modification, ferromagnetic layers 24 are formed on the first antiferromagnetic layers 21. The upper faces of the ferromagnetic layers 24 and the end faces of the conductive layers 22 form a common flat plane, and a multilayered film 43 including a magnetoresistive layer 42 as a magnetic sensing layer, a nonmagnetic layer 41, and a soft magnetic layer 40 is formed thereon.

FIGS. 13 to 16 show a series of steps for making the magnetoresistive element shown in FIG. 3 as an example of the method for making a magnetoresistive element in accordance with the present invention.

Figure 13:
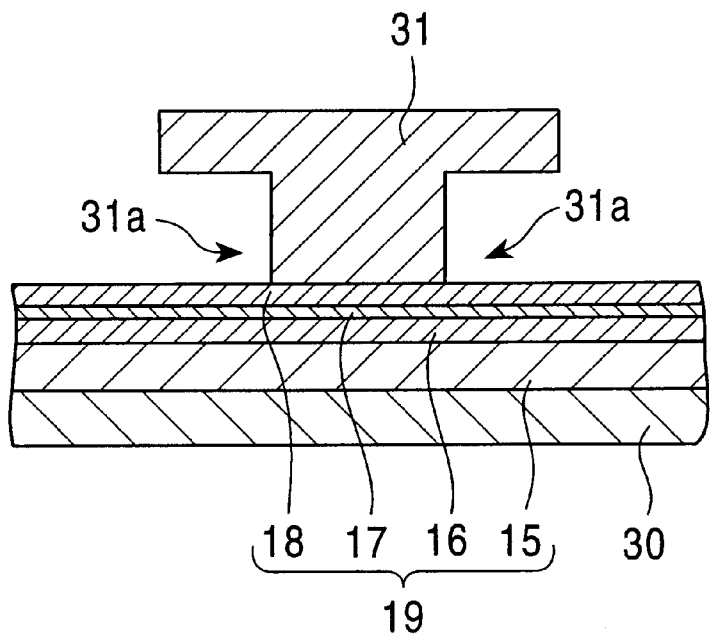
FIGS. 13 to 16 are cross-sectional views of steps in a method for making a magnetoresistive element in accordance with the present invention.

With reference to FIG. 13, a multilayered film 19 including a second antiferromagnetic layer 15, a pinned magnetic layer 16, a nonmagnetic layer 17, and a free magnetic layer 18, in that order, is formed on a substrate 30.

In the present invention, second antiferromagnetic layer 15 is preferably composed of a PtMn alloy, and may be composed of an X—Mn alloy wherein X is at least one element selected from the group consisting of Pd, Ir, Rh, and Ru, or an Pt—Mn—X' alloy wherein X' is at least one element selected from the group consisting of Pd, Ir, Ru, Au, and Ag. When the second antiferromagnetic layer 15 is formed of any of the above materials, annealing is necessary to generate a exchange coupling magnetic field at the interface to the pinned magnetic layer 16.

The pinned magnetic layer 16 and the free magnetic layer 18 are preferably composed of a Ni—Fe alloy, metallic cobalt, an Fe—Co alloy, an Fe—Co—Ni alloy, or a Co—Ni alloy. The nonmagnetic layer 17 is preferably composed of a nonmagnetic conductive material having low resistivity, such as copper.

With reference to FIG. 13, a lift-off resist layer 31 is formed on the free magnetic layer 18. The lift-off resist layer 31 has cutout sections 31a at both sides.

When dead regions and a sensitive region are preliminarily defined by the microtrack profile method, the cutout sections 31a are formed on the dead regions of the multilayered film 19 and the sensitive region of the multilayered film 19 is completely covered with the lift-off resist layer 31.

Figure 14:
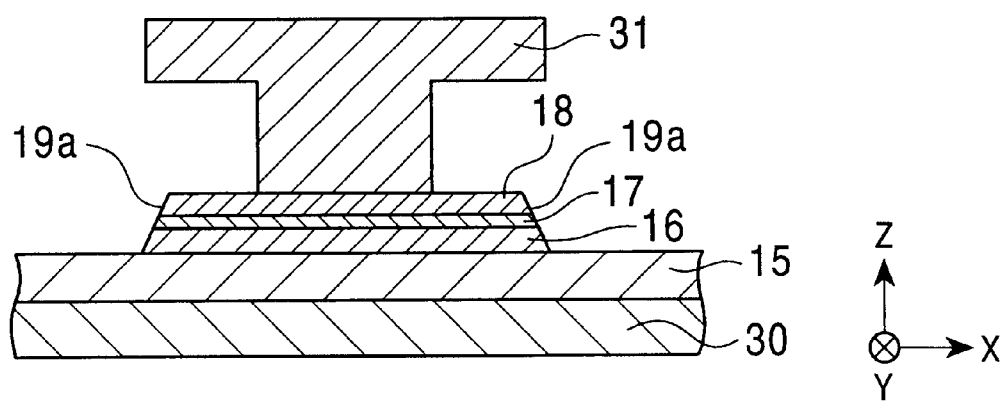

With reference to FIG. 14, both side faces 19a of the free magnetic layer 18 are etched by ion milling. In FIG. 14, the pinned magnetic layer 16, the nonmagnetic layer 17, and the free magnetic layer 18 are etched at the side faces 19a whereas the second antiferromagnetic layer 15 remains in the X direction.

When the first antiferromagnetic layers 21 are directly formed on the free magnetic layer 18, as in the first embodiment shown in FIG. 1, this ion milling step is not necessary. When the ferromagnetic layers 24 are partially formed in the side regions A of the free magnetic layer 18, as in the second embodiment shown in FIG. 2, the side regions A of the free magnetic layer 18 are etched while controlling the ion milling time or the like.

Figure 15:
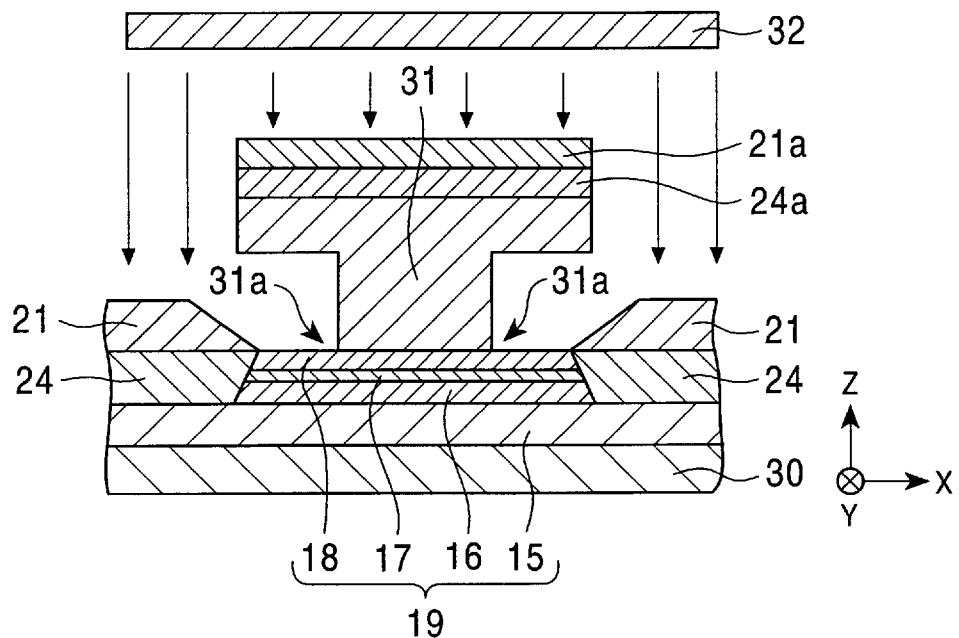

With reference to FIG. 15, ferromagnetic layers 24 and first antiferromagnetic layers 21 are continuously formed on both sides of the multilayered film 19 by sputtering. These layers are preferably formed by an ion-beam sputtering process, a long-throw sputtering process, or a collimation sputtering process.

With reference to FIG. 15, the substrate 30 provided with the multilayered film 19 is placed vertically with respect to a target 32, and ferromagnetic layers 24 and first antiferromagnetic layers 21 are formed vertically with respect to the multilayered film 19 by, for example, an ion beam sputtering process. According to this process, the ferromagnetic layers 24 and the first antiferromagnetic layers 21 are not formed in the cutout sections 31a. A layer 24a having the same composition as the ferromagnetic layers 24 and a layer 21a having the same composition as the first antiferromagnetic layers 21 are formed on the lift-off resist layer 31.

In this embodiment, the upper faces of the ferromagnetic layers 24 must be equal to or higher than the upper face of the free magnetic layer 18 in order to adequately apply a bias magnetic field to the free magnetic layer 18.

When the magnetoresistive element shown in FIG. 1 is formed in this step, the first antiferromagnetic layers 21 are formed directly on the free magnetic layer 18 by a sputtering process. When the magnetoresistive element shown in FIG. 2 is formed, the ferromagnetic layers 24 are formed on both side regions A of the free magnetic layer 18 by a sputtering process, and then the first antiferromagnetic layers 21 are continuously formed thereon by a sputtering process.

It is preferable that the first antiferromagnetic layers 21 be formed of an antiferromagnetic material having higher resistivity than that of conductive layers 22 which will be formed in the subsequent step. For example, the first antiferromagnetic layers 21 are preferably formed of an antiferromagnetic material of an electrically insulating oxide. Preferable electrically insulating oxides are NiO and $\alpha$-$Fe_2O_3$.

Alternatively, the first antiferromagnetic layers 21 may be composed of an X—Mn alloy wherein X is at least one element selected from the group consisting of Pt, Pd, Ir, Rh, Ru, and Os, or an X—Mn—X' alloy wherein X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and rare earth elements.

Preferably, in the present invention, the first antiferromagnetic layer 21 is formed of a material which has higher resistivity than that of the conductive layer 22 and a lower blocking temperature than that of the second antiferromagnetic layer 15. By such a low blocking temperature of the first antiferromagnetic layers 21, the magnetization of the pinned magnetic layer 16 and the magnetization of the free magnetic layer 18 can be aligned in a desired direction.

For example, when the second antiferromagnetic layer 15 is formed of a Pt—Mn alloy having a blocking temperature of approximately 380° C., the first antiferromagnetic layers 21 may be formed of a material having a lower blocking temperature, e.g., NiO (blocking temperature: approximately 230° C.), $\alpha\text{-}Fe_2O_3$ (blocking temperature: approximately 320° C.), an Ir—Mn alloy (blocking temperature: approximately 240° C.), or a Rh—Mn alloy (blocking temperature: approximately 200° C.).

Procedures for magnetization of the second antiferromagnetic layer 15 and the free magnetic layer 18 will now be described. After the spin-valve thin-film element is formed as shown in FIG. 15, the element is annealed as a first step while applying a magnetic field in the Y direction at a temperature which enables ordering of the crystal structure in the second antiferromagnetic layer 15 (for example, when the second antiferromagnetic layer 15 is composed of a Pt—Mn alloy, Pt atoms and Mn atoms are alternately arranged with regularity) or at a temperature which is lower than the blocking temperature of the first antiferromagnetic layers 21. The annealing time in the first step is several hours for ordering of the crystal structure or is several minutes to several tens of minutes when the annealing is performed at a temperature lower than the blocking temperature of the first antiferromagnetic layers 21.

An exchange anisotropic magnetic field generated between the pinned magnetic layer 16 and the second antiferromagnetic layer 15 during this step magnetizes the pinned magnetic layer 16 in the Y direction, and an exchange anisotropic magnetic field generated between the ferromagnetic layers 24. The first antiferromagnetic layers 21 magnetizes the free magnetic layer 18 in the Y direction, and the magnetization is aligned in the Y direction by the effect of the bias magnetic field from the ferromagnetic layers 24. Since the exchange anisotropic magnetic field generated between the second antiferromagnetic layer 15 and the pinned magnetic layer 16 is large, the magnetization of the pinned magnetic layer 16 is firmly fixed in the Y direction.

In the second step, annealing is performed at a temperature which is lower than the blocking temperature of the second antiferromagnetic layer 15 and is higher than the blocking temperature of the first antiferromagnetic layers 21 for several minutes to several tens of minutes, while a magnetic field is applied in the X direction. In this annealing step, an exchange anisotropic magnetic field generated between the first antiferromagnetic layers 21 and the ferromagnetic layers 24 decreases or becomes extinct, and the Y direction single-domain of free magnetic layer 18 is converted into multiple domains having magnetic moments in various directions.

As described above, the annealing temperature is lower than the blocking temperature of the second antiferromagnetic layer 15, the annealing time is significantly short, and the pinned magnetic layer 16 is firmly magnetized in the Y direction. Thus, the pinned magnetic layer 16 is still magnetized in the Y direction after the second step.

When the annealing temperature is gradually decreased, exchange coupling occurs at the interface between the first antiferromagnetic layer 21 and the ferromagnetic layer 24 at a temperature which is lower than the blocking temperature of the first antiferromagnetic layer 21 so that a bias magnetic field from the ferromagnetic layer 24 magnetizes the free magnetic layer 18 in the direction of the magnetic field which is applied in the second step (Y direction). As described above, the magnetization directions of the pinned magnetic layer 16 and the free magnetic layer 18 are controlled.

Figure 16:
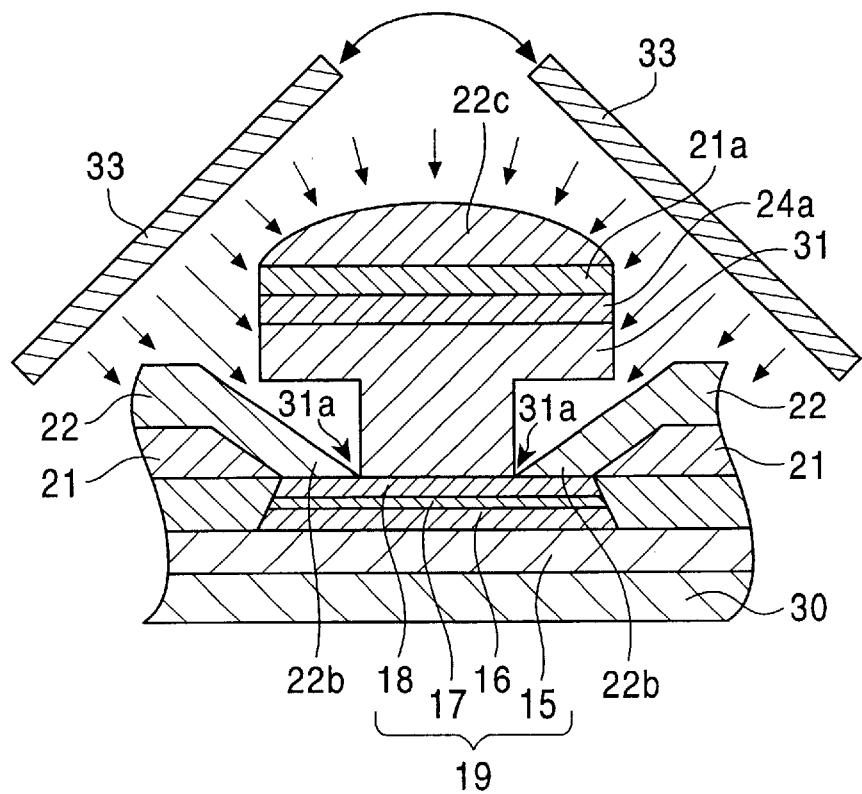

With reference to FIG. 16, conductive layers 22 are formed on the first antiferromagnetic layers 21 obliquely with respect to the multilayered film 19 by an ion-beam sputtering process, a long-throw sputtering process, or a collimation sputtering process so that the conductive layers 22 reach the cutout sections 31a under the lift-off resist layer 31. The irradiation angle of the ion beams is preferably in a range of 5° to 40° in order to adequately form the conductive layers 22 in the cutout sections 31a.

A Target 33 having a composition for the conductive layers 22 is obliquely placed with respect to the substrate 30 provided with the multilayered film 19. While the target 33 is moved on the substrate 30, the conductive layers 22 are deposited on the first antiferromagnetic layers 21 by the ion beam sputtering process. The conductive layers 22 are formed not only on the first antiferromagnetic layers 21 but also in the cutout sections 31a of the lift-off resist layer 31 by oblique sputtering. Thus, the conductive layers 22 in the cutout sections 31a extend over the free magnetic layer 18. Preferably, the conductive layers 22 are deposited on the dead regions of the multilayered film 19.

In the embodiment shown in FIG. 16, the substrate 30 is fixed and the target 33 is moved obliquely with respect to the substrate 30. Instead, the substrate 30 may be moved obliquely with respect to the fixed substrate 30. As shown in FIG. 16, a layer 22c having the same composition as that of the conductive layers 22 is formed on the layer 21a on the lift-off resist layer 31.

In the final step, the lift-off resist layer 31 is removed by a lift-off process using a resist stripping solution to form the magnetoresistive element having the structure shown in FIG. 3.

FIGS. 17 to 20 show steps in another methods for making the magnetoresistive element shown in FIG. 6 in accordance with the present invention.

Figure 17:
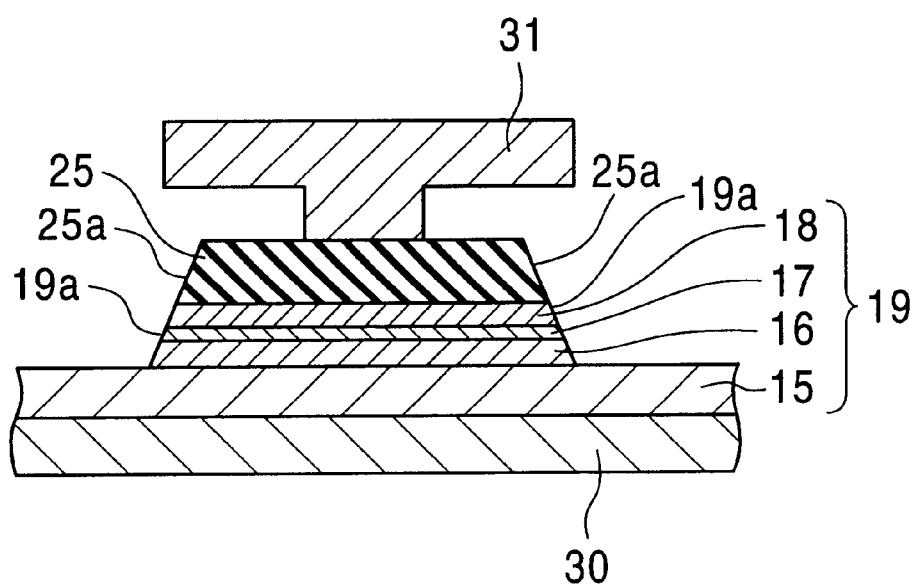
FIGS. 17 to 20 are cross-sectional views of steps in another method for making a magnetoresistive element in accordance with the present invention.

With reference to FIG. 17, a multilayered film 19 including a second antiferromagnetic layer 15, a pinned magnetic layer 16, a nonmagnetic layer 17, and a free magnetic layer 18, in that order from the bottom, is formed on a substrate 30, and an insulating layer 25 is formed on the free magnetic layer 18. The insulating layer 25 is composed of an insulating film, e.g., $Al_2O_3$, $SiO_2$, $Ti_2O_3$, TiO, or WO. A lift-off resist layer 31 is formed on the free magnetic layer 18. The lift-off resist layer 31 has cutout sections 31a at the lower portions.

When the dead regions and the sensitive region are determined by the above-mentioned microtrack profile process, the cutout sections 31a of the lift-off resist layer 31 are formed over the dead regions of the multilayered film 19, whereas the sensitive region of the multilayered film 19 is completely covered with the lift-off resist layer 31.

With reference to FIG. 17, both side faces 25a of the insulating layer 25 and both side faces 19a of the multilayered film 19 are etched by ion milling. In the embodiment shown in FIG. 17, the pinned magnetic layer 16, the nonmagnetic layer 17, and the free magnetic layer 18 are etched at the side faces 19a whereas the second antiferromagnetic layer 15 remains in the X direction.

When the first antiferromagnetic layers 21 are directly formed on the free magnetic layer 18, as in the first embodiment shown in FIG. 1, only the side faces 25a of the ferromagnetic layers 24 are etched whereas the both sides of the multilayered film 19 are not etched. When the ferromagnetic layers 24 are partially formed in the side regions A of the free magnetic layer 18, as in the second embodiment shown in FIG. 2, the side faces 25a of the insulating layer 25 are etched and then the side regions A of the free magnetic layer 18 are etched while controlling the ion milling time or the like.

Figure 18:
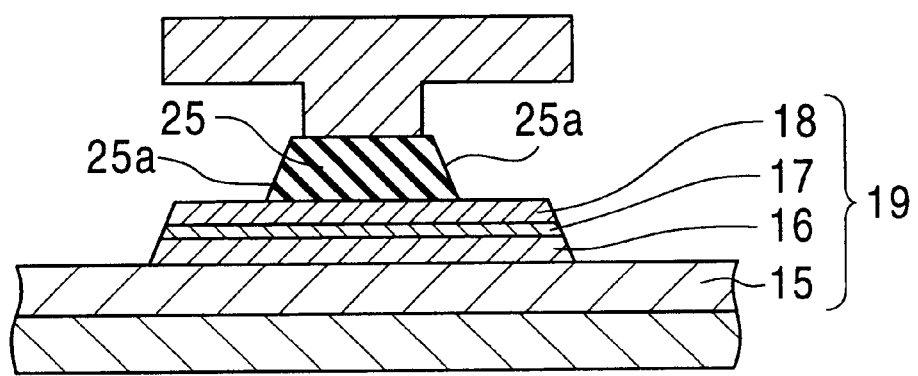

With reference to FIG. 18, only the side faces 25a of the insulating layer 25 are etched using a developing solution. It is preferable in the etching process that the width of the lower face of the insulating layer 25 is substantially equal to the width of the sensitive region. The free magnetic layer 18 is exposed from the insulating layer 25 at both sides.

Figure 19:
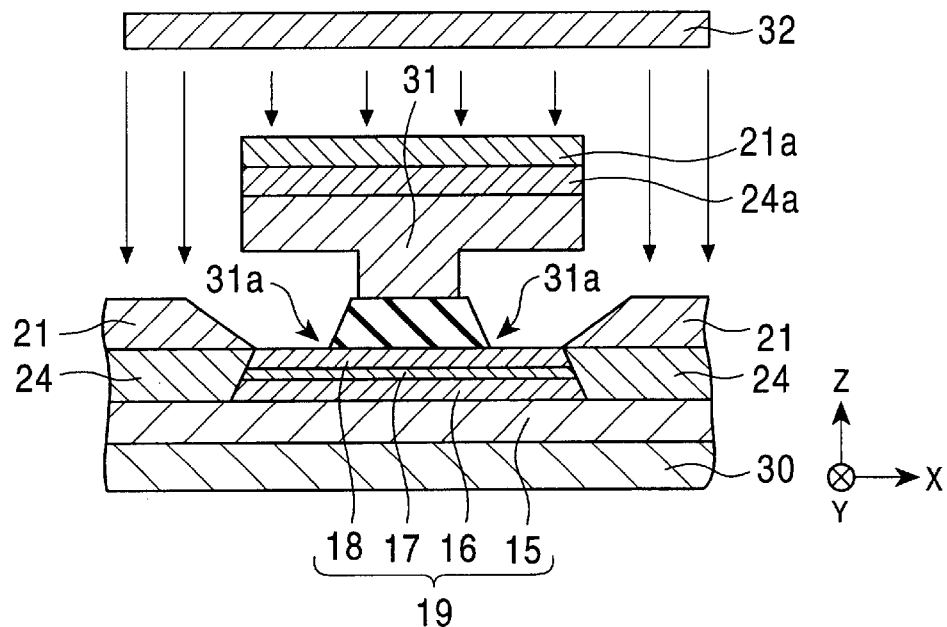

With reference to FIG. 19, ferromagnetic layers 24 and first antiferromagnetic layers 21 are continuously formed on both sides of the multilayered film 19 by sputtering. These layers are preferably formed by an ion-beam sputtering process, a long-throw sputtering process, or a collimation sputtering process.

With reference to FIG. 19, the substrate 30 provided with the multilayered film 19 is placed vertically with respect to a target 32, and ferromagnetic layers 24 and first antiferromagnetic layers 21 are formed vertically with respect to the multilayered film 19 by, for example, an ion beam sputtering process. According to this process, the ferromagnetic layers 24 and the first antiferromagnetic layers 21 are not formed in the cutout sections 31a. A layer 24a having the same composition as the ferromagnetic layers 24 and a layer 21a having the same composition as the first antiferromagnetic layers 21 are formed on the lift-off resist layer 31.

In this embodiment, the upper faces of the ferromagnetic layers 24 must be equal to or higher than the upper face of the free magnetic layer 18 in order to adequately apply a bias magnetic field to the free magnetic layer 18.

When the magnetoresistive element shown in FIG. 1 is formed in this step, the first antiferromagnetic layers 21 are formed directly on the free magnetic layer 18 by a sputtering process. When the magnetoresistive element shown in FIG. 2 is formed, the ferromagnetic layers 24 are formed on both side regions A of the free magnetic layer 18 by a sputtering process, and then the first antiferromagnetic layers 21 are continuously formed thereon by a sputtering process.

It is preferable that the first antiferromagnetic layers 21 be formed of an antiferromagnetic material having higher resistivity than that of conductive layers 22 which will be formed in the subsequent step. For example, the first antiferromagnetic layers 21 are preferably formed of an antiferromagnetic material of an electrically insulating oxide. Preferable electrically insulating oxides are NiO and $\alpha\text{-Fe}_2\text{O}_3$.

Alternatively, the first antiferromagnetic layers 21 may be composed of an X—Mn alloy wherein X is at least one element selected from the group consisting of Pt, Pd, Ir, Rh, Ru, and Os, or an X—Mn—X' alloy wherein X' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Ir, Sn, Hf, Ta, W, Re, Au, Pb, and rare earth elements.

Preferably, in the present invention, the first antiferromagnetic layers 21 are formed of a material which has higher resistivity than that of the conductive layers 22 and a lower blocking temperature than that of the second antiferromagnetic layer 15. By such a low blocking temperature of the first antiferromagnetic layers 21, the pinned magnetic layer 16 is magnetized in the Y direction whereas the free magnetic layer 18 is magnetized in the X direction.

Figure 20:
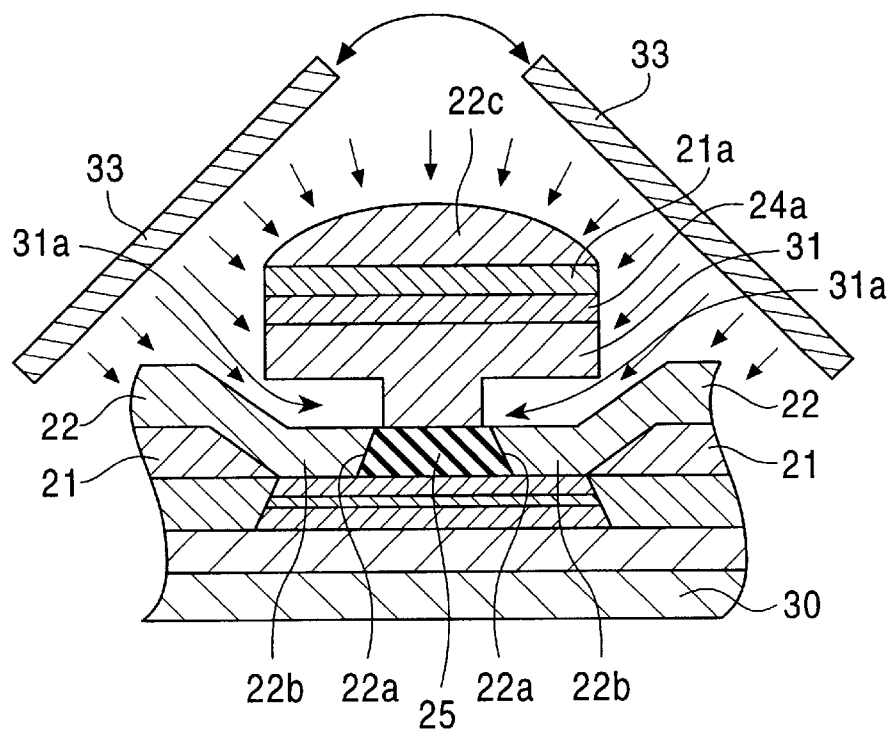
Figure 21:
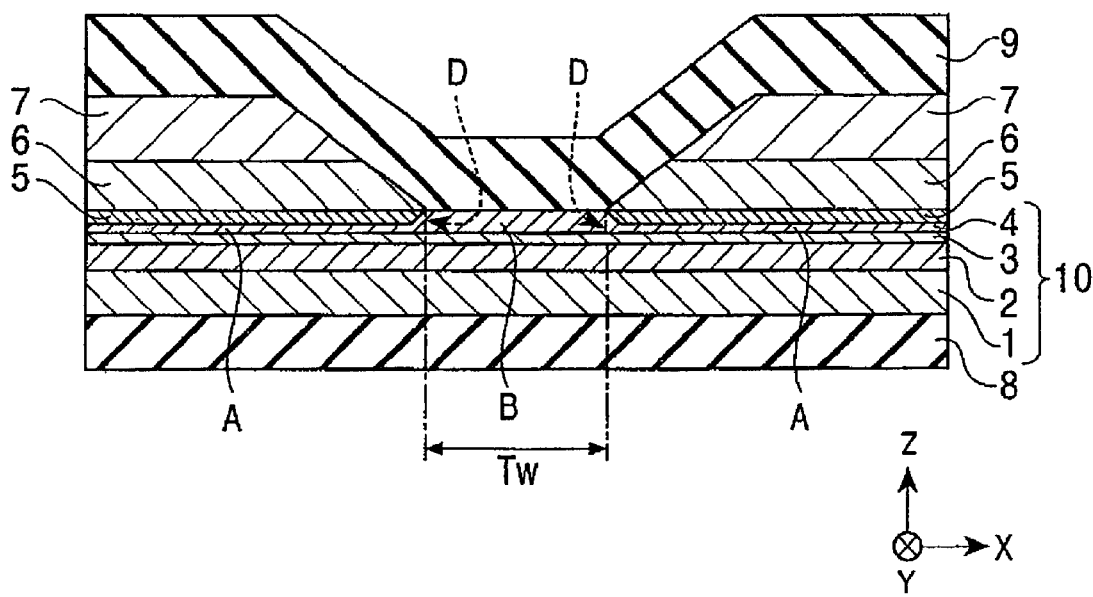
FIG. 21 is a partial cross-sectional view of a conventional magnetoresistive element.

With reference to FIG. 20, conductive layers 22 are formed on the first antiferromagnetic layers 21 obliquely with respect to the multilayered film 19 by an ion-beam sputtering process, a long-throw sputtering process, or a collimation sputtering process so that the conductive layers 22 reach the cutout sections 31a under the lift-off resist layer 31. The irradiation angle of the ion beams is preferably in a range of 5° to 40° in order to adequately form the conductive layers 22 in the cutout sections 31a.

For example, as shown in FIG. 16, a target 33 having a composition for the conductive layers 22 is obliquely placed with respect to the substrate 30 provided with the multilayered film 19. While the target 33 is moved on the substrate 30, the conductive layers 22 are deposited on the first antiferromagnetic layers 21 by the ion beam sputtering process. The conductive layers 22 are formed not only on the first antiferromagnetic layers 21 but also in the cutout sections 31a of the lift-off resist layer 31 by oblique sputtering. Thus, the conductive layers 22 in the cutout sections 31a extend over the free magnetic layer 18. Preferably, the conductive layers 22 are deposited on the dead regions of the multilayered film 19.

Since the insulating layer 25 is formed in the present invention, the end faces 22a of the conductive layers 22 extend along the side faces 25a of the insulating layer 25. Thus, the conductive layers 22 have a large thickness at the vicinity of the edges 22b. Moreover, the insulating layer 25 prevents the formation of the conductive layers 22 in the sensitive region of the multilayered film 19. Thus, in this embodiment, the read output is more adequately improved.

In an alternative embodiment in FIG. 20, the substrate 30 may be moved obliquely with respect to the fixed substrate 30. As shown in FIG. 16, a layer 22c having the same composition as that of the conductive layers 22 is formed on the layer 21a on the lift-off resist layer 31.

In the final step, the lift-off resist layer 31 is removed by a lift-off process using a resist stripping solution to form the magnetoresistive element having the structure shown in FIG. 6.

As described above, the magnetization of the free magnetic layer is oriented in a direction which is orthogonal to the magnetization of the pinned magnetic layer in the present invention. When the conductive layers on the first antiferromagnetic layers extend on the free magnetic layer, and when the first antiferromagnetic layers are formed of an antiferromagnetic material having higher resistivity than that of the conductive layers, the detecting current from the conductive layers adequately flows in the multilayered film while the shunts to the first antiferromagnetic layers are suppressed.

When the conductive layers extend on the nonsensitive regions which are formed both sides of the multilayered film and do not have a magnetoresistive effect, the detecting current from the conductive layers is concentrated in the sensitive region having the substantial magnetoresistive effect.

Accordingly, the magnetoresistive element in accordance with the present invention exhibits improved read output.

In the present invention, the conductive layers can be readily formed over the first antiferromagnetic layers and the free magnetic layer by an ion beam sputtering process using a lift-off resist.

What is claimed is:

1. A magnetoresistive element comprising:
    a multilayered film comprising a magnetic detecting layer having a magnetoresistive effect;
    a pair of first antiferromagnetic layers in contact with the magnetic detecting layer of the multilayered film at a predetermined gap in the track width direction, the first antiferromagnetic layers aligning the magnetization direction of the magnetic detecting layer;
    a pair of conductive layers in contact with the pair of first antiferromagnetic layers, the pair of conductive layers applying a detecting current to the multilayered film; and a first insulating layer provided between the pair of conductive layers, the side faces of the first insulating layer being covered with respective end faces of the conductive layers, a second insulating layer covering the first insulating layer and the conductive layers, the conductive layers being in contact with respective faces of the pair of first antiferromagnetic layers, and the conductive layers extending over the pair of first antiferromagnetic layers toward the magnetic detecting layer, wherein the first antiferromagnetic layers comprise an antiferromagnetic material having higher resistivity than that of the conductive layers, the conductive layers are superimposed with the corresponding first antiferromagnetic layers and are in contact with the magnetic detecting layer in a range of the predetermined gap, and the distance between the pair of conductive layers defines a track width when the multilayered film detects an external magnetic field, and wherein the multilayered film comprises a pinned magnetic layer having a pinned magnetization direction, a nonmagnetic conductive layer, and a free magnetic layer as the magnetic detecting layer having a variable magnetization direction with respect to an external magnetic field, the first antiferromagnetic layers are in contact with a pair of ferromagnetic layers lying at both sides of the free magnetic layer, and the magnetization direction of the free magnetic layer is oriented in a direction which is perpendicular to the magnetization direction of the pinned magnetic layer by exchange anisotropic coupling with the first antiferromagnetic layers, and further wherein the free magnetic layer extends to an exterior of the predetermined gap, the first antiferromagnetic layers cover the free magnetic layer in the exterior of the predetermined gap, the ferromagnetic layer is in contact with the first antiferromagnetic layer, the ferromagnetic layer and the antiferromagnetic layer facing each other at two sides of the free magnetic layer.

2. A magnetoresistive element according to claim 1, wherein the multilayered film comprises a pinned magnetic layer having a pinned magnetization direction, a nonmagnetic conductive layer, and a free magnetic layer as the magnetic detecting layer having a variable magnetization direction with respect to an external magnetic field, the pair of first antiferromagnetic layers are in contact with the free magnetic layer at the predetermined gap in the track width direction, and the magnetization direction of the free magnetic layer is oriented in a direction which is perpendicular to the magnetization direction of the pinned magnetic layer by exchange anisotropic coupling with the first antiferromagnetic layers.

3. A magnetoresistive element according to claim 1, wherein both side regions of the free magnetic layer in the track width direction are thinner than the central region, the ferromagnetic layers are formed on the side regions, and the conductive layers extend over the free magnetic layer, and further wherein the ferromagnetic layer is disposed between the first antiferromagnetic layer and the free magnetic layer.

4. A magnetoresistive element according to claim 1, wherein the multilayered film comprises a second antiferromagnetic layer, the magnetization direction of the pinned magnetic layer is pinned by exchange coupling with the second antiferromagnetic layer, the second antiferromagnetic layer extends in the track width direction, the upper faces of the ferromagnetic layers are equal to or higher than the upper face of the free magnetic layer, the ferromagnetic layers are in contact with the corresponding first antiferromagnetic layers, and the first antiferromagnetic layers extend to a position in contact with the free magnetic layer.

5. A magnetoresistive element according to claim 4, wherein the first antiferromagnetic layers comprise an antiferromagnetic material having a blocking temperature which is lower than that of the second antiferromagnetic layer.

6. A magnetoresistive element according to claim 1, wherein the electrically insulating oxide is selected from NiO and $\alpha\text{-Fe}_2\text{O}_3$.

* * * * *